United States Patent [19]

Moorehead

[11] 4,437,627
[45] Mar. 20, 1984

[54] INTEGRATED POWER PLANT INSTALLATION SYSTEM

[75] Inventor: James R. Moorehead, Bellevue, Wash.

[73] Assignee: The Boeing Company, Seattle, Wash.

[21] Appl. No.: 357,746

[22] Filed: Mar. 12, 1982

[51] Int. Cl.$^3$ .................... B64D 27/18; B64D 33/00
[52] U.S. Cl. .................... 244/54; 244/53 R; 244/110 B; 60/39.09; 60/39.31; 60/39.83; 60/226.2
[58] Field of Search .............. 244/53 R, 53 A, 54, 244/130, 55, 110 B, 129.1; 239/127.1, 127.3, 265.25–265.31; 60/226.1, 226.2, 39.31, 39.83, 39.09, 736, 230; 248/554

[56] References Cited

U.S. PATENT DOCUMENTS

| | | | |
|---|---|---|---|
| 3,279,182 | 10/1966 | Helmintoller | 60/226.2 |
| 3,327,465 | 6/1967 | Bockrath | 244/54 |
| 3,422,624 | 1/1969 | Brooks et al. | 244/230 |
| 3,480,237 | 11/1969 | Appleby | 244/130 |
| 3,500,644 | 3/1970 | Hom et al. | 60/226.2 |
| 3,831,888 | 8/1974 | Baker et al. | 244/54 |
| 4,013,246 | 3/1977 | Nightingale | 244/54 |
| 4,044,973 | 8/1977 | Moorehead | 244/54 |
| 4,198,018 | 4/1980 | Brault | 244/119 |
| 4,222,234 | 9/1980 | Adamson | 244/54 |

FOREIGN PATENT DOCUMENTS

| | | | |
|---|---|---|---|
| 2550525 | 5/1976 | Fed. Rep. of Germany | 244/54 |
| 1047027 | 12/1953 | France | 244/54 |
| 2061389 | 5/1981 | United Kingdom | 244/54 |
| 2072752 | 10/1981 | United Kingdom | 244/54 |

OTHER PUBLICATIONS

*Jane's All the World Aircraft*, p. 749, 1977–1978.

Primary Examiner—Galen L. Barefoot
Attorney, Agent, or Firm—Bernard A. Donahue; Ronald E. Suter; Steven W. Weinrieb

[57] ABSTRACT

An integrated power plant installation system for underwing high-bypass mid-length fan air duct core-mounted engines readily permits disconnection of the entire powerplant at the wing thereby virtually eliminating the necessity of disconnecting the engine and complex systems per se from the support strut when engine replacement or removal proves necessary. Excessive congestion within the vicinity of the strut box structure is eliminated by disposing the engine accessories, and auxiliary equipment and system lines, within the lower quadrant of the powerplant assembly in both a laterally and longitudinally distributed array. Potential catastrophic fire hazards within the nacelle are substantially eliminated by routing the fluid lines and electrical conduits axially aft and upwardly around the circumference of the engine within the nozzle section of the powerplant aft of all rotating discs. These latter features permit the utilization of a simplified strut box structure in that the same need not be provided with equipment clearance structure, conduit throughbores, and complex fire seals and drains. The strut structure is easily tunable with simple plate structure for flutter stiffness control, involving strut and wing bending in gusts. The wing attach/detach engine mounting system, particularly for a core-mounted engine by means of the simplified strut box structure, also facilitates the elimination of the conventional fan D, or split, duct system and enables the employment of a continuous hoop structure thrust reverser system.

12 Claims, 6 Drawing Figures

INTEGRATED POWER PLANT INSTALLATION SYSTEM

FIELD OF THE INVENTION

The present invention relates generally to aircraft engines, and more particularly to an integrated power plant installation system for underwing high-bypass engines having mid-length fan air ducts.

BACKGROUND OF THE INVENTION

Conventional installation systems for underwing high-bypass engines having mid-length fan air ducts represent the latter stages of an evolutionary process which initially began with the earliest turbojet engines which, compared to present-day engines, were substantially smaller, simpler, and lighter in weight. These early engines and their operational systems, however, exhibited a relatively high degree of unreliability. Consequently, the engines were required to be replaced relatively frequently, such as, for example, every five hundred (500) hours of flight time although some engines were allowed to remain on wing for 1000 hours or so. The installation systems for such engines therefore comprised various means or features whereby the engines themselves and thrust reversers were capable of being easily and quickly removed from the overall powerplant assembly. Such means or features generally related to the engine-strut and operational systems connections, and the accessibility thereto.

As powerplant and noise reduction technology evolved, however, and high-bypass mid-length duct engines were adopted, the aforenoted installation systems, accordingly modified yet nevertheless basically incorporated into the high-bypass midlength duct engine assemblies, have presented substantial operational, economic, and safety disadvantages and problems. Over the past twenty years, for example, the number of connections between the engine and the airplane strut-wing for the various operational systems for the engine and ducting has tripled. In addition, the attachment of a core-mounted engine has evolved to the point wherein as many as six structural connections are required between the engine case and the strut, at least one of these connections being of the multi-bolt type. During the same aforenoted period of time, the size of conventional turbojet engines has also dramatically increased. Engine cores, for example, currently measure approximately six feet in diameter while the engine fan cases currently measure approximately eight feet in diameter. As a result of these diametrical dimensions, the various operational systems and structural connections are often not readily accessible, and quite difficult to reach, by the field mechanics. Often, the mechanics must stand upon other structural components of the powerplant assembly in order to in fact gain accessibility to the engine-strut and operational systems connections.

It may readily be appreciated that because of higher compressor pressure ratios and turbine temperatures a great amount of heat is generated within the engine core. This heat is of course transmitted to the core case per se as well as to the core case environment defined interiorly of the engine core case and the fan duct environment defined exteriorly of the engine core case. Some advanced engines have added complex case cooling systems but nacelle temperatures have increased and will greatly increase if engine systems crack or fail. In view of the fact that the structural mountings or connections are partially secured to the engine core case, and as a result of a substantial number of the operational systems connections being disposed within the aforenoted two environments, great amounts of heat are transmitted to these various mountings and connections. The hot mounting and systems connections cannot therefore be readily removed or disconnected in the field until permitted to sufficiently cool. Alternatively, special tools must be utilized by the field mechanics, and insulation pads must be interposed between the mechanics and the hot propulsion system structures in order to protect such personnel from being burned. Consequently, in view of the fact that a substantial number of operational systems and mounting connections must be disconnected and re-connected when replacing a particular engine within a powerplant installation, and furthermore, in view of the additional fact that the operational systems and mounting connections can only be approached in a cautious manner in order to insure the safety of the field personnel, an engine-change or replacement operation has become quite time-consuming, tedious, and potentially dangerous.

Continuing further, another feature, originally derived from the earliest low-bypass ratio turbofan engines and accordingly modified during the aforenoted evolutionary process so as to be accommodated within the present-day conventional engine installation systems, comprises the strut-hinged fan duct cowl sections. These C or D ducts, as they are commonly known, were provided in order to permit the necessary accessibility to the engine-strut and engine operational systems connections. The D ducts were originally designed to be quickly openable and as large in their size as possible so as to expose the largest engine interior area as possible. As the present day engines evolved, and in order to accommodate the particular engine-strut mounting systems, the D ducts were hinged to the engine strut at the upper end of each duct while the lower end of each duct was latched to its mating duct beneath the engine core case. As the size of the engines have become progressively larger and heavier, the D ducts could no longer be manually handled by field mechanic personnel. Consequently, the engines were provided with suitable hydraulic-controlled devices for actuating the D ducts between their open and closed positions and for retaining the same in their open position.

It is apparent that a major disadvantage of the D duct system is that a substantial amount of excess weight, as embodied within the hydraulic opening devices, and the half-ducts themselves, is imparted to the overall engine system. Such devices also materially add to the manufacturing costs of the engine systems. Still further, in view of the fact that the D ducts are hingedly secured to the engine strut and tightly clamped about the engine core or fan case so as to provide the requisite sealing properties, the D ducts actually form a complete redundant engine mounting system, whereby the load paths are duplicated even though less rigid than primary mounts to the strut. As the strut bends under weight and air loads, the ducts are also caused to deflect. This has caused cracking within the fan duct acoustic linings. Replacement of the same obviously results in high maintenance costs. Some duct hinge systems have been designed to float or to have limits of deflection after which they then become rigid. These are very complex and expensive and manufacturing tolerances tend to be uncontrollable.

Another operational disadvantage of the conventional D duct systems resides in the fact that each duct presents four exposed internal corner structures to the fan air duct flow. As all corner structures disposed within an air flow produce wake, boundary layer, and turbulence losses, the propulsion units do not operate as efficiently as would otherwise be possible.

The D duct mounting system has also proven to be an operational hindrance and at times quite dangerous. The latching mechanisms, for example, which clamp the lower portions of the ducts together and about the engine core case have often proven difficult to align and latch. As the thrust reverser system is also encompassed within the aft end of the D duct system, misalignment of the ducts naturally affects the operations of the thrust reverser system. This misalignment is also rendered more pronounced as a result of the various bending and deflection loads impressed upon the engine strut, the engine core, and the D ducts in view of the aforenoted interrelated connection system defined between the engine core, the D ducts, and the engine strut.

Still further, as the duct structure can effectively retain the engine upon the strut structure in the aforenoted redundant manner, should the engine-strut mounting system fail, the engine could fall toward the ground when and if the D ducts are opened for engine inspection, maintenance, or replacement. In addition, should a D duct become detached during flight, as has in fact occurred, for example, due to high engine bending deflections and failures in the latching system, substantial damage to the aircraft can result. In the aforenoted instance, the detached D duct was thrust aft and upwardly under the wing and ruptured a fuel tank.

Another area of considerable concern in connection with conventional powerplants is the disposition of the various engine accessories, fuel lines, hydraulic lines, and the like within the powerplant units. With conventional powerplant systems, the fuel, electrical, bleed air, hydraulic, and starter air lines are disposed about the compressor and burner sections of the engine in a wrap-around fashion. Consequently, such zones are heavily congested thereby severely restricting accessibility to the engine, systems connections, and the accessories and equipment. Quite often one system overlaps another necessitating removal of one system, or part thereof, in order to maintain the one underneath.

The aforenoted disposition of the various fluid lines within the powerplant is also quite potentially dangerous in that the same poses real fire hazards to the powerplant and the aircraft. As has in fact already occurred, should the powerplant experience a turbine disc or compressor disc burst, the disc can sever the fuel lines disposed within the upper regions or quadrants of the powerplant assembly on its way to cutting through the firewalls shielding the strut. In one occurred instance, the resulting fire was of such intensity and time duration that the outboard wing section was burned through and departed the airplane. Fire hazards are also posed by the disposition per se of the fluid lines and equipment within the upper quadrants of the heated zone of the powerplant. Burner case cracks permit combustion chamber burnthroughs to occur thereby igniting a fuel line or severely damaging engine accessories and equipment. Fuel lines routed through the top strut and fire walls are vulnerable to these possible sources of ignition.

A last undesirable feature characteristic of conventional underwing high-bypass mid-length duct engines resides in the particular engine mounting strut employed within the system. This feature is concomitant with respect to the aforenoted disposition of the fluid lines and the engine accessory equipment because often the struts employed within the engine mounting systems were specifically structured in order to accommodate the disposition of the fluid lines and accessory equipment. For example, the strut structures were provided with through-bores for housing the various fluid lines operatively associated with the engine. The struts would also have specific, irregularly shaped configurations in order to clear particular auxiliary equipment disposed within the engine region. In a similar manner, the struts would be provided with offset or cut-out sections in order to accommodate the translatable thrust reverser structure. As noted hereinabove, the D ducts were hingedly secured to the engine struts, and consequently, the struts were provided with suitable hardware for hingedly mounting the D ducts thereon. Obviously, these specifically structured engine mounting struts are quite costly to fabricate and substantially more difficult to tune for flutter control in order to optimize the engine support functions of the strut under all ground or flight conditions. Also, the interdisposition of the fluid lines and equipment within the strut region only serves to further congest and hamper accessibility within this area of the powerplant. Still further, if the strut production tooling and manufacturing of parts has to be changed for stiffness to prevent flutter after flight tests, it can be very expensive if the strut and systems therein are complex as they are today.

OBJECTS OF THE INVENTION

Accordingly, it is an object of the present invention to provide a new and improved integrated power plant installation system.

Another object of the present invention is to provide a new and improved integrated power plant installation system which overcomes and eliminates the aforenoted operational and economic disadvantages and drawbacks, as well as the safety hazards, characteristic of conventional powerplant assemblies.

Still another object of the present invention is to provide a new and improved integrated power plant installation system which effectively terminates the evolutionary process which has prevailed over the past two decades with respect to the design of underwing powerplant installation systems by providing an integrated power plant installation system that fully accounts for system complexity, separation of system hazards, and return to simplicity and efficient load paths.

Yet another object of the present invention is to provide a new and improved integrated power plant installation system which is characterized by means which readily permit the disconnection or dismounting of the entire powerplant assembly from the aircraft wing as opposed to requiring removal or disconnection of the engine per se from the powerplant assembly.

Still yet another object of the present invention is to provide a new and improved integrated powerplant installation system whereby the replacement of an entire powerplant assembly relative to the wing structure can be accomplished simply and quickly, as well as safely with regard to non-bending of the structure.

Yet still another object of the present invention is to provide a new and improved integrated powerplant installation system wherein the disposition of the engine accessories and auxiliary equipment has been drastically altered as compared with conventional powerplant assemblies such that the equipment and accessories are now disposed within less congested areas of the entire powerplant assembly, accessibility to the equipment and accessories has been vastly improved, and the likelihood of heat and fire damage to the equipment and accessories has been drastically reduced.

A further object of the present invention is to provide a new and improved integrated powerplant installation system wherein in view of the aforenoted improved disposition of the engine accessories and auxiliary equipment, accessibility to such accessories and equipment is readily achieved through means of non-structural fairing pieces and openable engine case cowl sections whereby the aforenoted hinged fan duct cowl sections or D ducts may be eliminated from the system.

A still further object of the present invention is to provide a new and improved integrated powerplant installation system wherein the disposition of the engine fuel, hydraulic control, and air fluid lines has been drastically altered as compared with conventional powerplant assemblies such that the lines are now disposed within less congested areas of the entire powerplant assembly and the potential of a fire hazard has been considerably reduced in view of the fact that the fluid lines are no longer wrapped about the compressor and burner sections of the engine.

A yet further object of the present invention is to provide a new and improved integrated powerplant installation system wherein, in view of the aforenoted altered disposition of the engine accessories, auxiliary equipment, and fluid lines within the powerplant assembly, a substantially simplified mounting strut structure is able to be incorporated within the powerplant installation system.

A still yet further object of the present invention is to provide a new and improved integrated powerplant installation system wherein the aforenoted simplified mounting strut structure facilitates a substantially simplified core-mounting of the powerplant engine.

A yet still further object of the present invention is to provide a new and improved integrated powerplant installation wherein the aforenoted simplified core-mounting of the powerplant engine and the elimination of the complex, cumbersome, costly, and dangerous D duct system facilitates the introduction of a substantially simplified thrust-reverser system.

An additional object of the present invention is to provide a new and improved integrated powerplant installation system wherein the aforenoted fairing pieces-accessibility system and the core-mounted engine thrust reverser system provide the requisite accessibility to the strut box-wing fitting and strut box-wing support linkage means so as to facilitate the simplified disconnection and replacement of the powerplant assembly at the aircraft wing.

A still additional object of the present invention is to provide a new and improved integrated powerplant installation system wherein the aforenoted fairing pieces-accessibility system and the core-mounted engine thrust reverser system provide the requisite accessibility to the engine-strut connections when in fact the engine per se must be removed from the powerplant assembly.

A yet additional object of the present invention is to provide a new and improved integrated powerplant installation system wherein in view of the elimination of the D duct system for the mounting of the fan duct cowl sections and the thrust reverser system for the powerplant, redundant load paths have been able to be eliminated and therefore the load paths within the system of the present invention are well-defined as determined by the improved engine-mounting strut.

A still yet additional object of the present invention is to provide a new and improved integrated powerplant installation system wherein the improved engine-mounting strut structure is relatively simple to tune for flutter control or avoidance.

A yet still additional object of the present invention is to provide a new and improved integrated powerplant installation system wherein the improved engine-mounting strut structure is substantially lighter in weight than conventional engine strut structures and capable of being manufactured more economically.

A last object of the present invention is to provide a new and improved integrated power plant installation system whereby the entire system can be ground tested complete with all ducting, reverser, systems, controls, and structure to verify the installed thrust leakage, controls, reversing, and heat rejection and cooling and instrumentation.

SUMMARY OF THE INVENTION

The foregoing and other objectives are achieved in accordance with the present invention through the provision of a new and improved integrated powerplant installation system which comprises four fittings fixedly secured to the aircraft wing rib or spar structures. The engine is core-mounted to the powerplant structural support strut by means of forward and rear mounts, and the strut is provided with mounting lugs or flanges by which the strut-engine powerplant assembly is able to be directly and indirectly secured to the aforenoted fittings and spar structures by suitable shear bolt fasteners.

More particularly, the strut box structure is provided with two, laterally spaced central lugs or flanges, one forward lug, and one rearward lug. A single hoisting hard point or bracket is also integrally provided upon the upper forwardmost portion of the strut box structure so as to be disposed at the center of gravity of the entire powerplant assembly. In this manner, the entire powerplant assembly can be easily handled by suitable hoist apparatus so as to initially position the powerplant for direct fixation of the same to the wing support structure at the two central support points. Support linkage means also extend from a forwardly extending wing fitting and a rearwardly disposed wing fitting. Adjustment of the hoisting apparatus then permits indirect fixation of the powerplant assembly to the wing by respectively connecting the linkage means to the forward and rearward strut box lugs. The mounting system of the present invention is therefore seen to comprise the four mounting locations as defined between the engine strut box structure and the wing fittings, and the two support link structures. The linkage connections are redundant for basic structural safety whereby either linkage means will fully support the entire powerplant assembly for all vertical and shear loads. Powerplant removal therefore only requires the disconnection of the aforenoted four shear bolt connections between the strut box structure and the wing fittings or linkages. Access to such connections is provided through means of non-structural fairing pieces as is access to all engine operational systems disconnects. All disconnects and connections are disposed in non-heated regions, are therefore cool, and safely accessible by personnel.

The integrated powerplant installation system of the present invention also comprises the disposition of the engine accessories and auxiliary equipment below the engine core so as to advantageously affect the weight and drag characteristics of the powerplant assembly. In addition, this disposition of the accessories and equipment eliminates congestion within conventionally congested areas by distributing the locations of the accessories and equipment throughout the lower quadrant region of the powerplant in both lateral and longitudinal arrays. Still further, the hydraulic, fuel, pneumatic, and electrical lines or conduits extend aft within the powerplant and then upwardly around the interior circumference of the engine core case. In this manner, the fluid lines are not wrapped about the compressor and burner sections of the engine so as not to present potential fire hazards for the powerplant.

The particular disposition of the engine accessories and auxiliary equipment, as well as their accompanying lines and fluid conduits, permits the engine mounting support strut box structure of the present invention to have a simplified rectangular parallelepiped structure or configuration. No specific recesses or cut-out portions are therefore required to be provided within the design structure of the engine strut of the present invention in view of the fact that the strut area of the powerplant assembly is now substantially uncongested. Thus, "clearance" areas are unnecessary as the strut does not have to accommodate the engine accessories or auxiliary equipment within adjacent areas of the powerplant. Similarly, the strut box does not have to be provided with suitable apertures or through-bores for accommodating the accessory or equipment fluid lines. The simplified strut box structure is therefore capable of being more economically produced and permits more simplified tuning for more accurate flutter control. The particular core-mounting of the powerplant engine upon the strut box structure of the present invention also facilitates the elimination of the conventional D duct fan cowl sections and their hinged mountings upon conventional strut structures. In this manner, the load paths for the powerplant assembly of the present invention, as defined by the strut box structure of the present invention, are well defined.

The last primary structural feature characteristic of the present invention is the provision of thrust reverser structure incorporated within the fan cowling and axially translatable upon a continuous ring structure mounted upon the powerplant engine fan case. This thrust reverser system is especially unique to a core-mounted engine as disclosed in accordance with the present invention and as facilitated by the aforenoted simplified engine strut box structure. The central and forward portions of the strut box structure are disposed within the fan air flow, and the thrust reverser system of the fan cowling or fan duct is disposed above the central portion of the strut box structure. A clearance recess is provided within the sub-structure defined above the strut box so as to permit the translational movement of the thrust reverser structure, particularly the continuous support ring structure thereof.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
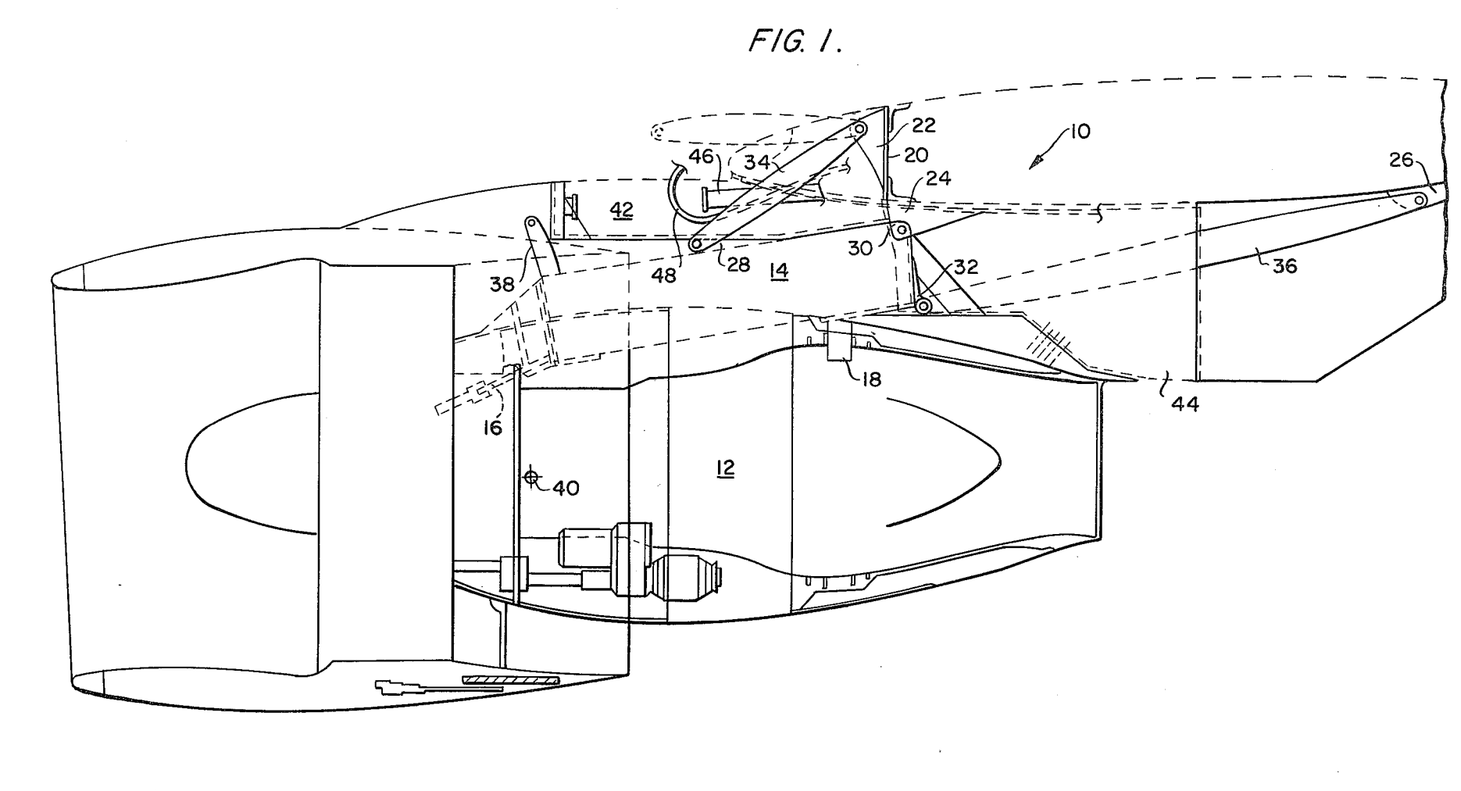
FIG. 1 is a longitudinal cross-sectional view of an underwing high-bypass mid-length duct turbofan engine showing the powerplant-wing attach/detach system characteristic of the present invention and its cooperative parts.

Referring now to the drawings, and more particularly to FIG. 1 thereof, there is disclosed a high-bypass mid-length duct turbofan engine underwing attach/detach mounting system constructed in accordance with the present invention and generally indicated by the reference character 10. The system includes a core-mounted engine 12 which is secured to a strut box structure 14 by means of forward and rear mounting means 16 and 18, respectively. The mounting means 16 and 18 are disposed along the centerline, or within the vicinity of the centerline, of the engine, and each mounting system is of the multi-bolt type. They are not readily accessible by field mechanic personnel and they also comprise hot connections. Consequently, it is not desirable to separate or disconnect the engine 12 from the mounting strut 14 should the engine need to be replaced.

To the contrary, it is far more desirable to be able to separate the entire powerplant assembly from the wing as opposed to separating or removing the engine 12 per se from the powerplant assembly. Consequently, in accordance with the system of the present invention, the forward wing spar and rib structure 20 has a first forwardly extending support fitting or bracket 22 fixedly secured thereto, while a pair of similar, laterally spaced dependent fittings or brackets 24, only one of which is shown, are also fixedly secured thereto. A rearwardly disposed dependent fitting or bracket 26, similar to fittings 24, is likewise secured to rearwardly located wing rib structure, not shown. The brackets or fittings 24 straddle the engine centerline and provide yaw and roll restraint for the mounted powerplant assembly.

The strut box structure 14 is provided with a first upstanding lug member 28 which is aligned with the engine centerline and which is disposed substantially centrally along the longitudinal extent of the strut box.

A pair of laterally spaced lug members 30 are provided along the upper rear edge portion of the strut box so as to straddle the engine centerline in an aligned manner corresponding to the disposition of the wing fittings 24, while a rearwardly extending lug member 32 is fixedly secured to the lower rear edge portion of the strut box along the engine centerline. The strut box lugs 30 are adapted to be directly mated with the dependent wing fittings 24, while the strut lugs 28 and 32 are adapted to be indirectly mated with the wing fittings 22 and 26, respectively, through means of support linkage members 34 and 36. These linkage members provide pitch restraint for the powerplant when the latter is disposed in its mounted position upon the aircraft wing, and both horizontal and vertical loads are shared. The linkages are also fully redundant in that either one can accommodate the design loads of the powerplant should there be a failure within one of the linkage systems.

A single hoisting hard point or bracket 38 is fixedly secured to the forwardmost portion of the strut box structure 14 at the upper edge thereof so as to be disposed within the same transverse plane, as taken along the longitudinal axis of the powerplant, as that of the powerplant center of gravity 40. In this manner, the entire powerplant assembly can be easily handled by suitable hoisting apparatus. In mounting or attaching the powerplant upon the wing structure, the hoisting apparatus will initially elevate the powerplant such that the strut box lugs 30 can at first be aligned with and secured to the wing fittings 24. In particular, one of the lugs 30 will at first be aligned with and secured to its respective fitting 24 through means of suitable shear bolt fastening means. The strut box 14 and its attached powerplant can then be rotated slightly so as to facilitate the alignment and attachment of the second bolt fastening device. It has been found that the second fastening device should be of the cone-bolt type in order to properly and easily accomplish the vertical take-up and final mating of the second sets of lugs and fittings 30 and 24. Subsequent to the mating of both sets of lugs 30 and fittings 24, the hoist apparatus may be appropriately adjusted to then mate lug 28 and linkage member 34 or lug 32 and linkage member 36 followed by the interconnection of the other lug-linkage set. Linkage member 36 is shown in FIG. 1 when the same is disposed in its fully connected orientation, while the fully connected orientation or disposition of linkage member 34 is shown in solid lines with the disconnected mode thereof being shown by dotted lines.

In order to remove a fully installed powerplant assembly, it is readily appreciated that only the four fastening connections comprising strut lug 28 and linkage member 34, strut lugs 30 and wing fittings 24, and strut lug 32 and rear linkage member 36 need be disconnected. These connections are all relatively cool and accessibility thereto is readily achieved in accordance with the powerplant assembly of the present invention through means of three non-structural fairing pieces. An upper forward fairing piece is denoted at 42 while two lateral rearward fairing pieces are denoted at 44, only one of which is shown. Each fairing piece can be easily handled by field mechanic personnel, even under high-wind conditions. The removal of the fairing pieces also provides the requisite accessibility to the engine operational systems connections. These are exemplified by the air conditioning conduit 46 and the electrical lines 48. While the air conditioning duct 46 is illustrated as being disconnected, it is of course to be appreciated that an intermediate flexible connecting conduit completes the connection for the air duct 46. In a similar manner, the electrical lines 48 will also be suitably connected when the operational systems are fully connected. These electrical lines are of course conventional and serve to provide electrical power for the various electrical systems or instruments, such as, for example, the engine generator, various motor-operated valves, oil and fuel pressure instrument gauges, and the like.

Figure 2:
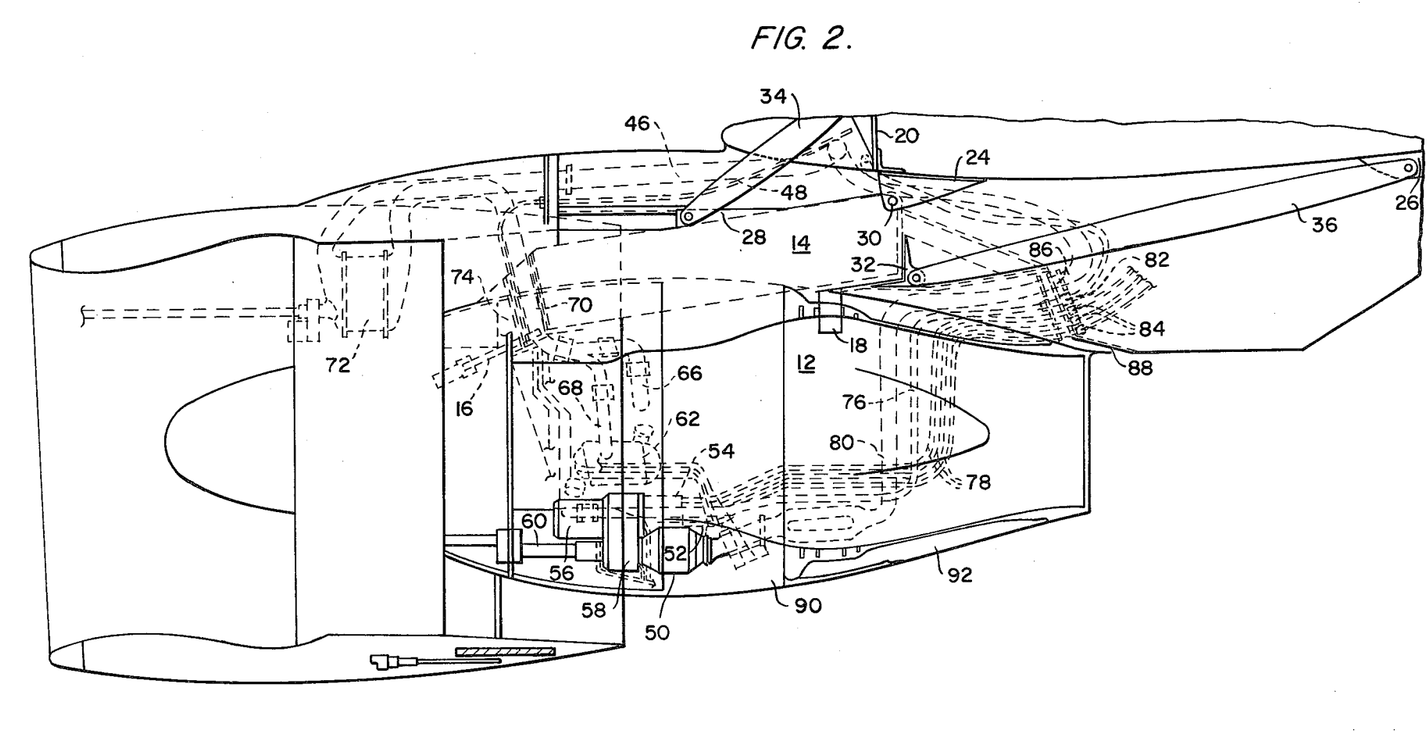
FIG. 2 is a view similar to that of FIG. 1 showing however the improved engine accessory and auxiliary equipment disposition and fluid line routing system characteristic of the present invention.

Referring now to FIG. 2, the improved engine accessory and auxiliary equipment disposition and fluid line routing system characteristic of the present invention is disclosed. As has been noted hereinbefore, conventional powerplant systems have been characterized by the disposition of the engine accessories and auxiliary equipment, and the accompanying fluid lines serving the same, within the upper quadrant of the powerplant and within the vicinity of the compressor and burner sections of the engine. The occurrence of a considerable number of nacelle fires has led to the investigation for a viable solution to the fire hazard problem confronting conventional powerplants, as well as the excessive congestion resulting from the disposition of the various engine accessories and auxiliary equipment within a relatively small defined region of the powerplant. In accordance with the present invention, the particular disposition or re-location of the engine accessories and auxiliary equipment throughout the lower quadrants of the powerplant, as well as the particular routing of the concomitant fluid lines for such accessories and equipment, will serve to resolve the aforenoted problems. In addition, by mounting the accessories and equipment within the lower quadrants of the powerplant and beneath the engine core, favorable weight and drag characteristics for the powerplant are achieved. Slightly diametrically larger lower nacelle lines have shown no appreciable drag penalty.

With particular reference being made to FIG. 2, it is seen that the primary or major engine accessories and auxiliary equipment, such as, for example, the starter mechanism 50, the electrical generator 52, the hydraulic pump 54, the fuel pump 56, and the gear box 58 are all disposed beneath the engine core or upon the lower sides of the engine core yet within the lower quadrant of the powerplant. The gear box drive shaft 60 of course extends forwardly of the gear box 58, and the engine oil tank 62 is also disclosed. In view of the fact that these accessories and equipment are disposed in the disclosed distributed arrangement so as to relieve the congestion characteristic of conventional powerplants, it is to be additionally appreciated that the structure of the strut box 14 is dramatically simplified as may be seen by additional reference to FIG. 3. The strut box 14 is in the form of a rectangular parallelepiped with a plurality of vertically oriented, transversely extending stiffeners 64 disposed interiorly thereof. As the accessories-equipment is no longer located within the upper region of the powerplant, and particularly within the vicinity of the strut box 14, clearance recesses, cutout sections, or off-sets do not have to be defined within the strut structure in order to accommodate the accessories and equipment. Similarly, apertures or through-bores for the various accessory or equipment fluid lines do not have to be defined within strut box structure 14. As disclosed in FIGURE 2, for example, the high pressure, hot compressor bleed line 66 and the medium pressure compressor bleed line 68 both feed into a single hot air conduit 70. This latter conduit extends upwardly into the nose cowl region of the powerplant so as to provide anti-icing or de-icing service thereto. The conduit then continues through a pre-cooler 72 which provides heat exchange processing so as to exhaust cooler air for air conditioning purposes via conduit 46. The upper forward disposition of the precooler is operationally advantageous in that the incoming fan air provides efficient cooling air for the precooler. Reference to both FIGS. 2 and 4 discloses the fact that in lieu of the strut box structure being provided with the heretofore conventional conduit line through-bores, the hot air bleed line 70 is routed through a hollow forging member 74 disposed contiguously in front of strut box 14. The forging member 74 likewise houses the electrical conduit lines which eventually become lines or conduit 48. In addition to the various electrical systems noted hereinabove, conduit 48 may also house the electrical controls or power lines for the fuel controls and thrust reverser.

With continued reference being made to FIG. 2, the fluid lines which extend from the various accessories, such as, for example, the fuel pump 56, the hydraulic pump 54, and the starter 50, are routed substantially horizontally in the aft direction so as to extend axially. These fluid lines are respectively noted as at 76, 78, and 80. Additional electrical conduits are similarly routed but are not shown. When the lines are within the vicinity of the aft end of the engine core, they then extend vertically upwardly so as to be connected to quick-disconnect means respectively noted at 82, 84, and 86 located upon an aft bulkhead 88. This bulkhead is supported from the strut and is also disconnectable and removable from the airplane wing structure when the entire powerplant assembly is removed from the aircraft wing. When the electrical, fuel, hydraulic, and pneumatic lines and conduits are routed upwardly toward the bulkhead disconnects, in order to again efficiently provide the requisite routing for the same with the minimum congestion involved, the lines and conduits are routed with the annulus defined between the cowling and the circumference of the engine core case with, for example, the fuel and hydraulic lines extending in a clockwise direction around one side of the engine core while the electrical and pneumatic lines and conduits extend in a counterclockwise direction about the other side of the engine core.

In view of the fact that the various lines and conduits, particularly the fuel and hydraulic lines, are not disposed within the vicinity of the compressor, burner, and turbine sections of the engine, or wrapped thereabout, the aforenoted potential fire hazards within the nacelle are dramatically reduced. Similarly, should a turbine burst failure occur wherein an expelled turbine disc ruptures a fuel or hydraulic line, any resulting fire will automatically be disposed beneath the wing structure. With the resulting air flow patterns, the fire does not present a substantial danger to the wings per se, their fuel tanks, and the like. It is lastly noted that accessibility to the accessories and equipment is simplified through means of openable cowl sections as noted at 90 as well as conical nozzle fairing structure 92.

Referring again to FIG. 3 and the simplified strut box structure 14 of the present invention, as a result of the aforenoted resulting strut box structure, it is appreciated that the same may be manufactured quite economically, and the resulting structure is also relatively light in weight. The strut box structure must of course accommodate various loads under all ground and in-flight operations such as weight, air loads, fuel weight, lift and drag forces, powerplant weight torsion and torque loads, thrust loads, and the like. Similar forces act upon the strut box as transmitted by the wing structure. In order to accommodate all of these forces, the strut box must be appropriately tuned for flutter control, avoidance or elimination. These parameters are of course determined through the appropriate flight testing programs in order to prevent premature fatigue or failures. Such tuning is able to be accomplished relatively easily with respect to simplified strut structures as opposed to relatively complex strut structures. In accordance with the present invention, the strut structure may be tuned simply by altering the gauge of the metal structural material. Alternatively, the strut box structure may be fabricated from composites.

It is further noted that the particular attach/detach mounting or installation system of the present invention, as well as the particular disposition of the engine accessories, auxiliary equipment, and routing of the various fluid and electrical lines and conduits, has permitted the conventional fan D ducts to be eliminated in view of the drastically altered accessibility requirements of the powerplant. The simplified strut box structure which core-mounts the powerplant engine has its forward portion or end housed interiorly of the fan duct and immersed within the fan air flow. The thrust reverser system is incorporated within the aft end portion of the fan duct, and as a result of the aforenoted elimination of the D duct, and the particular disposition of the strut box structure of the present invention relative to the fan duct so as not to structurally interfere therewith, a vastly simplified thrust reverser system is able to be utilized in connection with the core-mounted engines of the present invention.

Figures 5, 6:
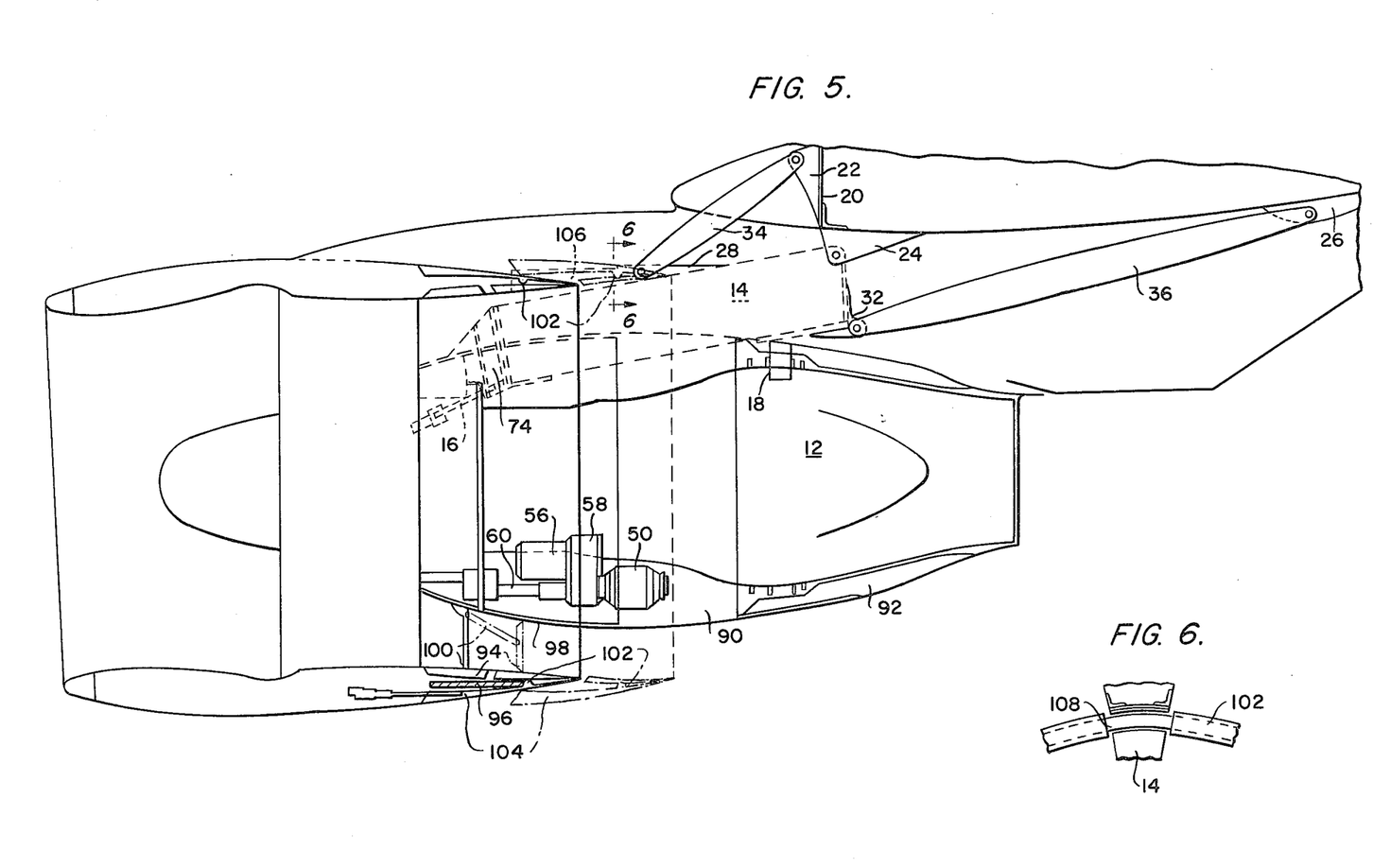
FIG. 5 is a view similar to that of FIG. 1 showing however the particular structure of the continuous ring thrust reverser system characteristic of the present invention and its cooperative parts.
FIG. 6 is a cross-sectional view of the continuous ring structure of the thrust reverser system of FIG. 5 as taken along the lines 6—6 of FIG. 5 and showing its relative disposition with respect to the one-piece forward fairing support and the strut box structure.

In particular, the thrust reverser system of the present invention may best be appreciated as a result of reference being made to FIGS. 5 and 6 of the drawings. The thrust reverser system comprises the conventional blocker doors and the air flow-reversing cascades 96. In FIG. 5 it is noted that the blocker doors 94 are shown in their non-reversing mode in solid lines and in their reversing mode in dotted lines. The cascades 96 are only shown in their reversing modes in solid lines, that is, they are not illustrated in their non-reversing mode. The blocker doors 94 are pivotably mounted upon the engine core case 98 through means of suitable linkage structure 100, and suitable actuating devices, not shown, are provided for moving the blocker doors 94 between their two modes as well as for translatably moving the cascades 96 between their two mode positions.

Figures 3, 4:
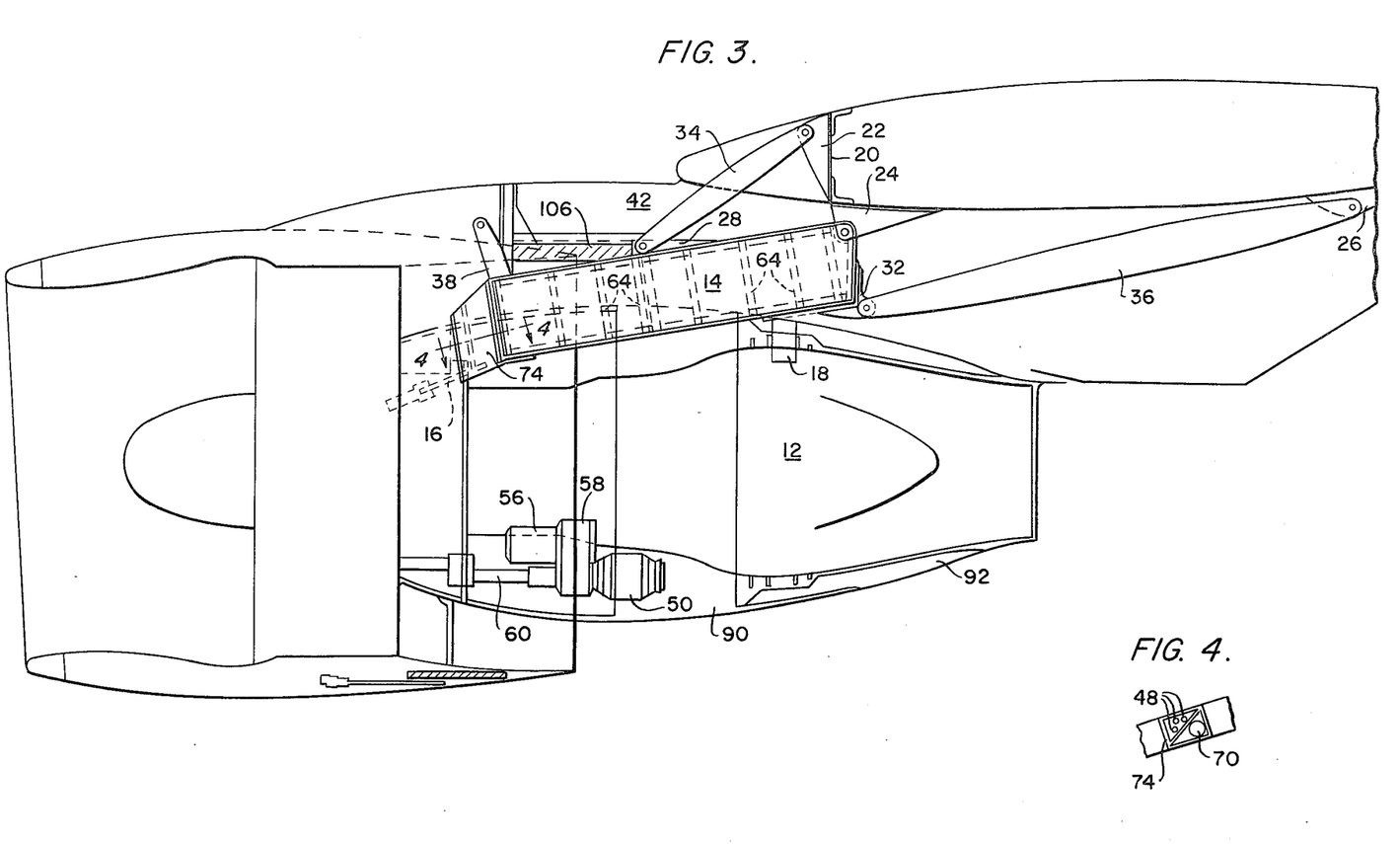
FIG. 3 is a view similar to that of FIG. 1 showing however the particular strut box structure characteristic of the present invention.
FIG. 4 is a cross-sectional view of the strut box hollow forging of FIG. 3 taken along the lines 4—4 of FIG. 3.

In view of the fact that the conventional fan D ducts have been able to be eliminated by the mounting or installation system of the present invention, wherein such conventional D duct systems the thrust reversers were of course incorporated within each semi-circular D duct, the system of the present invention permits a single closed loop or continuous hoop thrust reverser system to be employed. The mounting structure for the reverser system comprises a structural ring/sleeve member 102 which is axially translatable by means of the aforenoted actuating devices, not shown. The blocker doors 94 and cascades 96 are interconnected with the translatable ring structure 102 such that when the actuating devices axially translate the ring structure 102 between its forward thrust and reverse thrust positions, the blocker doors 94 and the cascades 96 are also accordingly actuated to their appropriate positions. In FIG. 5, the forward thrust position of the ring structure 102 as well as the aft portion 104 of the fan duct is illustrated in solid lines while the reverse thrust position of such structural components is illustrated in dotted lines. In order to permit the translational movement of the ring structure 102 without any interference with surrounding structural components within the vicinity of the strut box structure 14, a suitable recess 106 is provided within the strut sub-structure disposed above the strut box structure 14 as best seen in FIGS. 3 and 5.

It is to be appreciated that there are no structural interconnections defined between the thrust reverser system of the present invention and the strut box structure of the present invention as is the case with conventional powerplant installation systems. Consequently, there are no redundant load paths characteristic of the system, and to the contrary, the load paths of the system are well-defined. Again, too, in view of the fact that no hinged connections are defined between the strut box structure and the fan duct, as was characteristic of the D duct system, the strut box structure is rendered simplified in structure, relatively inexpensive to manufacture, and light in weight. Similarly with respect to the fan duct or cowling. A one-piece continuous structure is easier and less expensive to manufacture, and to incorporate acoustic material therein, than the conventional D ducts. Still further, such structure is more efficient from air flow viewpoints in view of less losses due to turbulence, boundary layers, wakes, and the like.

As best seen from FIG. 6, the uppermost portion of the thrust reverser ring structure is provided with a splice piece or portion 108. This part is of course an integral component of the thrust reverser ring system, however, it can be designed for even more significant functions. In particular, the splice member can provide the option of being either shearable so as to allow engine separation from the strut in the event of an engine mount failure, or alternatively, the same can be appropriately stressed so as to retain the engine on the aircraft even in the event of some types of engine mount failure.

More particularly, the ring splice member can be provided with a weak shear section such that if, for example, the front engine-to-strut mount should fail, the splice member would shear and allow the engine to fall vertically to ground. Alternatively, the splice member can be made stronger such that upon failure of the front engine-to-strut mount, the splice member may in fact be capable of retaining the engine upon the strut. This is considered to be advantageous from both economical and safety viewpoints.

On the other hand, should a major engine failure occur, such as, for example, seizure of the turbine rotors, the windup torque impressed upon the rear engine-to-strut mount can be large enough to cause failure of the mount. In this case, it is not desirable for the front engine-to-strut mount to retain the engine upon the strut in a precariously angled or skewed orientation or attitude. This is because a major failure such as an engine seizure must not endanger continued flight. A viable means of dealing with this particular problem is that an engine seizure capable of causing separation of the engine from the strut is capable of being estimated from a design load factor viewpoint. Accordingly, the ring splice member may be possibly pre-designed so as to permit engine-to-strut separation should a maximum pre-determined angular attitude be attained by the engine following a rear mount failure.

Obviously, many modifications and variations of the present invention are possible in light of the foregoing teachings. It is therefore to be understood that within the scope of the appended claims, the present invention may be practiced otherwise than as specifically described herein.

What is claimed as new and desired to be secured by Letters Patent of the United States is:

1. An underwing powerplant installation system comprising:
   a powerplant;
   strut means for securing said powerplant to the wing of said aircraft;
   a plurality of aircraft wing bracket fittings including a first, forwardly extending fitting secured to a front wing spar, a pair of laterally spaced dependent fittings secured to said front wing spar, and a fourth dependent fitting secured to a rear wing spar;
   first lug means including a pair of laterally spaced lugs secured to the upper rear edge portion of said strut means for aligned mating with said pair of laterally spaced dependent wing bracket fittings;
   linkage means having one end thereof secured to the remainder of said plurality of aircraft wing bracket fittings; and
   second lug means including a third lug secured to the upper surface of said strut means mid-way along the longitudinal extend thereof for engagement with a first one of said linkage means, and a fourth lug secured to the lower rear edge portion of said strut means for engagement with a second one of said linkage means.

2. The powerplant installation system as set forth in claim 1, further comprising:
   hoist bracket means secured to said strut means and aligned with the center of gravity of said powerplant for permitting hoist apparatus to manipulate said powerplant.

3. The powerplant installation system as set forth in claim 1, further comprising:
   a plurality of non-structural fairing pieces removably secured to said wing and powerplant for permitting ready accessibility to the fastening connections as defined between said lug means of said strut means, said wing bracket fittings, and said linkage means.

4. An underwing aircraft powerplant installation system as set forth in claim 1, wherein:
   said strut means has the configuration of a rectangular parallelepiped.

5. In an aircraft-mounted turbofan powerplant having an engine core and an engine core case, the improvement comprising:
   the engine accessories and auxiliary equipment are mounted within the lower quadrant of said core case such that some of said accessories and equipment are disposed beneath said engine core while the remaining accessories and equipment are disposed toward the lateral lower side portions of said engine core yet within the engine core case; and
   the fluid conduits and electrical lines servicing said accessories and equipment are all directed and routed axially aft within said lower quadrant of said core case so as to extend into the nozzle area of said core case wherein said fluid conduits and electrical lines are disposed and directed vertically upwardly and circumferentially solely about the inner circumference of said nozzle area of said core case.

6. In said turbofan powerplant as set forth in claim 5, wherein:
   a first portion of said fluid conduits and electrical lines are directed in a counterclockwise direction about the engine core and within the interior of said engine core case; and
   a second portion of said fluid conduits and electrical lines are directed in a clockwise direction about the engine core and within the interior of said engine core case.

7. In said turbofan powerplant as set forth in claim 5, further comprising:
   disconnect means secured upon the aircraft wing for permitting disconnection or connection of said fluid conduits and electrical lines at said wing.

8. In said turbofan powerplant as set forth in claim 5, further comprising:
   strut means for supporting said engine of said powerplant upon the wing of said aircraft.

9. In said turbofan powerplant as set forth in claim 8, wherein:
   said strut means has the configuration of a rectangular parallelepiped.

10. In the underwing system as set forth in claim 8:
    said strut is fabricated of metallic material.

11. In the underwing system set forth in claim 8: said strut is fabricated of composite material.

12. In a core-mounted aircraft turbofan powerplant having thrust reverser means incorporated into the powerplant fan duct and strut means interconnecting the powerplant engine core to the aircraft wing, the improvement comprising:
    an upper portion of said fan duct being disposed above said strut means;
    a non-structural fairing piece secured to said wing and powerplant, and interposed between said upper portion of said fan duct and said wing;
    a continuous closed loop ring structure mounted within the aft portion of said fan duct;
    said thrust reverser means being operatively connected to said ring structure;
    means for translatably moving said ring structure and said thrust reverser means between a first forward thrust mode position and a second reverse thrust mode position; and
    recess means defined within sub-structure of said strut means disposed above said strut means, and within said fairing piece, for accommodating said translatable fan duct thrust reverser ring structure when said ring structure is moved between said first and second mode positions.

* * * * *